(12) United States Patent
Dunn

(10) Patent No.: US 8,277,092 B2
(45) Date of Patent: Oct. 2, 2012

(54) LAMP ASSEMBLY UTILIZING LIGHT EMITTING DIODES

(75) Inventor: Timothy Dunn, Falconer, NY (US)

(73) Assignee: Truck-Lite Co., LLC, Falconer, NY (US)

( * ) Notice: Subject to any disclaimer, the term of this patent is extended or adjusted under 35 U.S.C. 154(b) by 399 days.

(21) Appl. No.: 11/974,255

(22) Filed: Oct. 12, 2007

(65) Prior Publication Data

US 2009/0097264 A1    Apr. 16, 2009

(51) Int. Cl.
*F21V 29/00*    (2006.01)

(52) U.S. Cl. .................... 362/373; 362/264; 362/265

(58) Field of Classification Search .......... 362/265, 362/264, 373
See application file for complete search history.

(56) References Cited

U.S. PATENT DOCUMENTS

| | | | |
|---|---|---|---|
| 4,104,533 A | 8/1978 | Iverson | 250/551 |
| 4,752,693 A | 6/1988 | Nagano | 250/551 |
| 5,765,940 A | 6/1998 | Levy et al. | 362/240 |
| 5,803,579 A | 9/1998 | Turnbull | 362/83.1 |
| 6,239,716 B1 | 5/2001 | Pross | 340/5.4 |
| 6,400,101 B1 | 6/2002 | Biebl | 315/291 |
| 6,628,252 B2 | 9/2003 | Hoshino | 345/82 |
| 6,653,789 B2 | 11/2003 | Roller | 315/80 |
| 6,798,152 B2 | 9/2004 | Rooke | 315/209 R |
| 6,870,328 B2 | 3/2005 | Tanabe | 315/291 |
| 6,924,744 B2 * | 8/2005 | Bohlander et al. | 340/815.45 |
| 6,949,889 B2 | 9/2005 | Bertrand | 315/291 |
| 6,954,039 B2 | 10/2005 | Lin | 315/291 |
| 6,957,897 B1 | 10/2005 | Nelson | 362/184 |
| 7,114,834 B2 | 10/2006 | Rivas | 362/373 |
| 7,192,155 B2 | 3/2007 | Morrow | 362/153.1 |
| 7,214,952 B2 | 5/2007 | Klipstein | 250/504 R |
| 7,317,403 B2 * | 1/2008 | Grootes et al. | 340/815.45 |
| 7,651,245 B2 * | 1/2010 | Thomas et al. | 362/294 |
| 2005/0007770 A1 * | 1/2005 | Bowman et al. | 362/157 |
| 2005/0063179 A1 * | 3/2005 | Niemann | 362/184 |
| 2005/0068459 A1 | 3/2005 | Holmes | 348/372 |
| 2005/0243041 A1 | 11/2005 | Vinn | 345/102 |
| 2006/0082332 A1 | 4/2006 | Ito | 307/10.8 |
| 2006/0197722 A1 | 9/2006 | Nakajima | 345/82 |
| 2007/0013620 A1 | 1/2007 | Tanahashi | 345/82 |
| 2008/0212319 A1 * | 9/2008 | Klipstein | 362/231 |
| 2010/0014289 A1 * | 1/2010 | Thomas et al. | 362/235 |

OTHER PUBLICATIONS

Infineon Technologies, Inc. application note for the BCR401 and BCR402 describing the power dissipation benefits of using their current source., 2007 Nishikawa et. al.—Sep. 2006.; Telecommunications Energy Conference, 28th Annual International, Sep. 2006 Michael Day, LED-Driver Considerations, www.ti.com/sc/analogapp, Oct. 2004.

\* cited by examiner

*Primary Examiner* — John A Ward
(74) *Attorney, Agent, or Firm* — The Bilicki Law Firm, P.C.

(57) ABSTRACT

A lamp assembly is provided. The lamp assembly has a housing that functions as a heat sink for the dissipation of heat therefrom. A circuit board assembly is carried by the housing and has a drive circuit that has a current regulator. A plurality of light emitting diodes are also present and are configured to be driven by a current source regulated by the current regulator so as to decrease the amount of heat generated through driving the plurality of light emitting diodes such that the housing is optimally sized to still function effectively as a heat sink.

14 Claims, 7 Drawing Sheets

LAMP ASSEMBLY UTILIZING LIGHT EMITTING DIODES

FIELD

This application relates to a lamp assembly for a vehicle. More particularly, the application relates to a lamp assembly that has light emitting diodes driven by a current source in order to increase the efficiency of a heat sink of the lamp assembly.

BACKGROUND

Vehicles are commonly provided with lamp assemblies in order to increase visibility. Lamp assemblies may also find utility in communicating actions of the driver such as braking, backing-up, and turning to other drivers on the road. It is known to employ light emitting diodes (LEDs) in lamp assemblies on vehicles for purposes of illumination.

LEDs in lamp assemblies are typically driven through the use of a resistor drive. This arrangement has the tendency to produce poor light output at low voltages and may cause excessive heat production at higher input voltages. Certain challenges exist in the design of lamp assemblies employing this type of driving scheme in that the housing may not be sufficiently sized or configured to accommodate the excessive heat generation. Further, the LEDs may not be adequately protected from over-current should a resistor drive be utilized.

Although it is known to apply a current source to protect the LEDs from over-current in the design of lamp assemblies, there remains room for variation and improvement within the art.

SUMMARY

One aspect of one embodiment is provided in a lamp assembly that has a housing with an interior surface and an exterior surface that has at least one fin for use in dissipating heat from the housing. The housing functions as a heat sink. A plurality of light emitting diodes are present and are carried by the housing. The light emitting diodes are configured to be driven by a current source regulated by a current regulator so as to reduce the amount of heat needed to be dissipated from the housing.

Another aspect of an additional embodiment is found in a lamp assembly as immediately mentioned that further includes a circuit board assembly that is attached to the interior surface of the housing. The circuit board assembly has a drive circuit for use in driving the plurality of light emitting diodes.

An additional aspect of another embodiment resides in a lamp assembly as immediately discussed in which the plurality of light emitting diodes are arranged into a plurality of light emitting diode banks that each have a plurality of the of light emitting diodes connected in series. Also, the circuit board assembly has a plurality of linear current regulators. Each one of the linear current regulators is associated with a different one of the plurality of light emitting diode banks. Each one of the linear current regulators is configured for regulating the current flowing through the plurality of light emitting diodes in the light emitting diode bank to which the linear current regulator is associated.

Another aspect of yet another embodiment is provided in a lamp assembly as mentioned above in which the circuit board assembly is made of flame resistant FR4.

Also provided is an aspect of one embodiment of the lamp as mentioned prior in which the exterior surface includes an exterior side surface. A portion of the exterior side surface is curved in shape. A plurality of fins for use in dissipating heat from the housing are located on the curved portion of the exterior side surface.

One aspect of a further embodiment resides in a lamp assembly as immediately discussed in which the plurality of fins on the curved portion of the exterior side surface are parallel to one another.

An additional aspect of another embodiment includes a lamp assembly as previously discussed in which the exterior surface includes an exterior end surface. A plurality of fins for use in dissipating heat from the housing are located on the exterior end surface.

Another aspect of a further embodiment includes a lamp assembly as immediately discussed in which the plurality of fins on the exterior end surface are parallel to one another along at least half of the length of the exterior end surface.

One aspect of one embodiment is provided in a lamp assembly that has a housing that functions as a heat sink for the dissipation of heat therefrom. A circuit board assembly is included and is carried by the housing. The circuit board assembly has a drive circuit that has a current regulator. A plurality of light emitting diodes are also present and are configured to be driven by a current source regulated by the current regulator so as to decrease the amount of heat generated through driving the plurality of light emitting diodes such that the housing is optimally sized to still function effectively as a heat sink.

Another aspect of an additional embodiment resides in a lamp assembly that has a housing with an interior surface and an exterior end surface. The housing has an exterior side surface with a curved portion. A plurality of fins are located on the curved portion of the exterior side surface and are parallel to one another. A plurality of fins are located on the exterior end surface. The fins are used for dissipating heat from the housing. A circuit board assembly is attached to the interior surface of the housing. The circuit board assembly has a drive circuit that has a current regulator. A plurality of light emitting diodes are also included. The light emitting diodes are configured to be driven by a current source regulated by the current regulator so as to reduce the amount of heat needed to be dissipated from the housing. The plurality of light emitting diodes are arranged into a plurality of light emitting diode banks that each have a plurality of the of light emitting diodes connected in series. The circuit board assembly has a plurality of linear current regulators. Each one of the linear current regulators is associated with a different one of the plurality of light emitting diode banks. Each one of the linear current regulators is configured for regulating the current flowing through the plurality of light emitting diodes in the light emitting diode bank to which the linear current regulator is associated.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

Repeat use of reference characters in the present specification and drawings is intended to represent the same or analogous features or elements.

DETAILED DESCRIPTION OF REPRESENTATIVE EMBODIMENTS

Reference will now be made in detail to embodiments of the invention, one or more examples of which are illustrated in the drawings.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to about 7 also includes a limit of up to about 5, up to about 3, and up to about 4.5.

Figure 1:
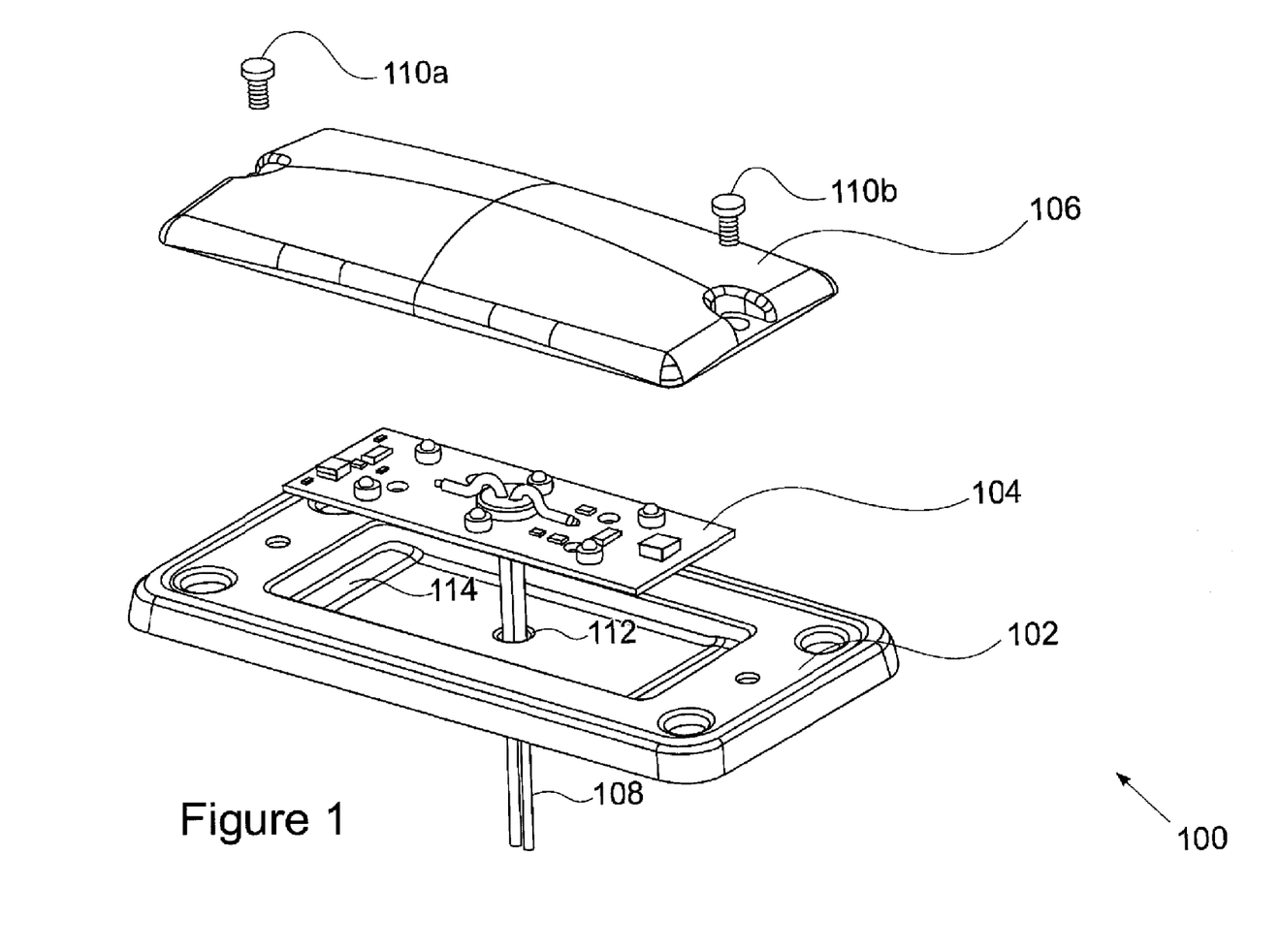
FIG. 1 is an exploded perspective view of one embodiment of a lamp assembly.

FIG. 1 illustrates an exploded perspective view of one embodiment of a lamp assembly 100 for a vehicle. The lamp assembly 100 includes a housing 102, a circuit board assembly 104, an optically transmitting system 106, one or more connecting wires 108 and one or more attachment devices 110. As shown, the attachment devices 110 include attachment device 110a and attachment device 110b that are bolts. However, it is to be understood that the attachment devices 110 may be any type of mechanical fastener in accordance with other embodiments. Housing 102 includes an opening 112 and a ledge 114. Circuit board assembly 104 includes various electronic components that are interconnected to form a drive circuit of the lamp assembly 100. Electronic components may include a plurality of Light Emitting Diodes (LEDs) to emit light from the lamp assembly 100. In various embodiments, the plurality of LEDs may be arranged as a plurality of banks of LEDs. The drive circuit, the electronic components and their interconnections are explained in detail in conjunction with FIGS. 3-6.

Housing 102 is configured for attachment to the vehicle. Housing 102 provides support to the circuit board assembly 104 and optically transmitting system 106. In the embodiment shown in FIG. 1, housing 102 is rectangular in shape, with a tapered structure for carrying circuit board assembly 104. In various embodiments, circuit board assembly 104 is made of a metal based circuit board material, a polymer based circuit board material or an epoxy fiberglass material. In accordance with certain embodiments the circuit board assembly 104 does not include a metal core board but instead has a flame resistant 4 (FR4) board. Housing 104 includes opening 112 to allow connecting wires 108 to enter housing 102. Connecting wires 108 connect circuit board assembly 104 with a power source (not shown in FIG. 1). Housing 102 includes ledge 114 to receive the circuit board assembly 104 in housing 102. In an embodiment, circuit board assembly 104 is attached to housing 102 through connection devices (not shown in FIG. 1). Examples of the connection devices may include, but are not limited to, screws, nuts, bolts, rivets, couplings, fasteners, flanges, adhesive material and fastening tabs.

Optically transmitting system 106 transmits a beam of light emitted by the plurality of LEDs present on the circuit board assembly 104. In an embodiment, optically transmitting system 106 is configured to shape the beam of light emitted by the plurality of LEDs. Optically transmitting system 106 is attached to housing 102. In an embodiment, optically transmitting system 106 is attached to housing 102 using an attachment device 110, such as attachment devices 110a and 110b. Examples of attachment device 110 may include, but are not limited to, screws, nuts, bolts, rivets, couplings, fasteners, flanges, adhesive material and fastening tabs. Examples of optically transmitting system 106 may include, but are not limited to, a lens, a glass sheet or any other transparent medium. In the embodiment shown in FIG. 1, the face of optically transmitting system 106, such as a lens, is smooth and is exposed to the environment.

In accordance with one embodiment, lamp assembly 100 includes a thermal interface (not shown in FIG. 1) that acts as a heat sink for circuit board assembly 104. The thermal interface is made of a thermally conductive material that absorbs and dissipates heat produced from various electronic components of circuit board assembly 104. In another embodiment, housing 102 is made of the thermally conductive material. As such, various embodiments exist in which the thermal interface may or may not be present.

It is to be understood that the specific designation for lamp assembly 100 is for the convenience of the reader and is not to be construed as limiting lamp assembly 100 to specific numbers, sizes, shapes or types of housing 102, circuit board assembly 104 and optically transmitting system 106.

Figure 2:
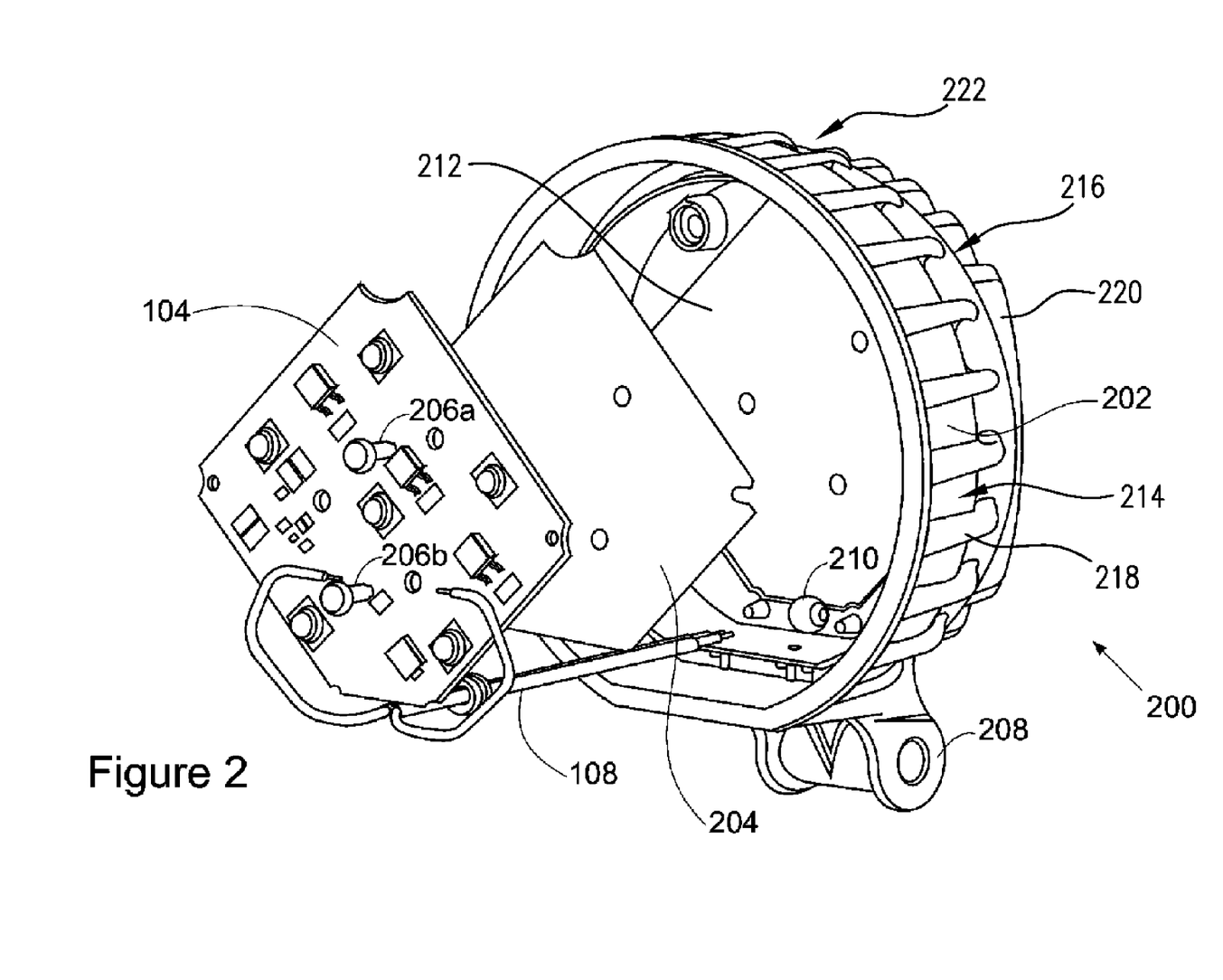
FIG. 2 is an exploded perspective view of another embodiment of the lamp assembly.

FIG. 2 illustrates an exploded perspective view of another embodiment of a lamp assembly 200 for a vehicle, which, in the embodiment shown, includes a housing 202, circuit board assembly 104, a thermal interface 204, a connection device 206 and a hinge 208.

Housing 202 is configured for attachment to the vehicle. Housing 202 supports circuit board assembly 104. In the embodiment shown in FIG. 2, housing 102 is circular in shape with a tapered structure for carrying circuit board assembly 104. Circuit board assembly 104 is connected to housing 202 through connection devices 206. Examples of connection devices 206 may include, but are not limited to, screws, nuts, bolts, rivets, couplings, fasteners, flanges, adhesive material and fastening tabs. The circuit board assembly 104 may be attached to an interior surface 212 of the housing 202. In this regard, the circuit board assembly 104 may or may not contact the interior surface 212. For instance, the connection devices 206 may be fashioned so that the circuit board assembly 104 is spaced some distance, yet attached to, the interior surface 212. In another arrangement, the bottom of the circuit board assembly 104 may contact and rest upon the interior surface 212 while the connection devices 206 secure these two elements together.

Details pertaining to the electronic components of the circuit board assembly 104 are explained in detail in conjunction with FIGS. 3-6. Housing 202 includes an opening 210 to allow one or more connecting wires 108 to enter housing 202. One or more connecting wires 108 connect circuit board assembly 104 with a power source (not shown in FIG. 1).

Thermal interface 204 is disposed between housing 202 and circuit board assembly 104. Thermal interface 204 is made of a thermally conductive material, which absorbs and dissipates heat produced from various electronic components of the circuit board assembly 104. Examples of thermally conductive material may include a Q-PAD® thermal interface that is supplied by the Bergguist Company having offices at 18930 West 78th Street, Chanhassen, Minn. Another material that may be employed as the thermally conductive material is Arctic Silver® 5 (AS5) that is supplied by Arctic Silver Inc., having offices at 2230 W. Sunnyside Ave., Suite 6, Visalia, Calif. Additional types of thermally conductive material that may be employed include white-colored paste, thermal grease, phase change materials, and the like. In an embodiment, housing 102 is made of the thermally conductive material. In various embodiments, the use of a larger or more efficient thermal interface 204 may manage the increased heat generated from various electronic components of the circuit board assembly 104. In an embodiment, an optically transmitting system, such as optically transmitting system 106, is attached to housing 202. Although described as including the thermal interface 204, other embodiments exist in which the lamp assembly 200 does not include a thermal interface 204.

In an alternate embodiment, a potting material (not shown) may be used on housing 102, to enhance mechanical strength, provide electrical insulation, and enhance vibration and shock resistance of lamp assembly 100. For example, a potting material such as an epoxy, may be used to hold circuit board assembly 204 in place, as well as to seal lamp assembly 100 from water and environmental damage.

Lamp assembly 200 is mounted on the vehicle through hinge 208. In various embodiments, lamp assembly 200 may be mounted on the vehicle through screws, nuts, bolts, rivets, couplings, fasteners, flanges, adhesive material, fastening tabs, soldering joints, and the like.

In the embodiment shown in FIG. 2, lamp assembly 200, including housing 202, is substantially circular in shape and functions a general illumination device and can be used in a variety of manners in conjunction with the vehicle and the present disclosure is not to be taken as limited to only the mentioned uses. Although not shown, housing 202 may include a flange that provides strength and protection to lamp assembly 200.

Figure 7:
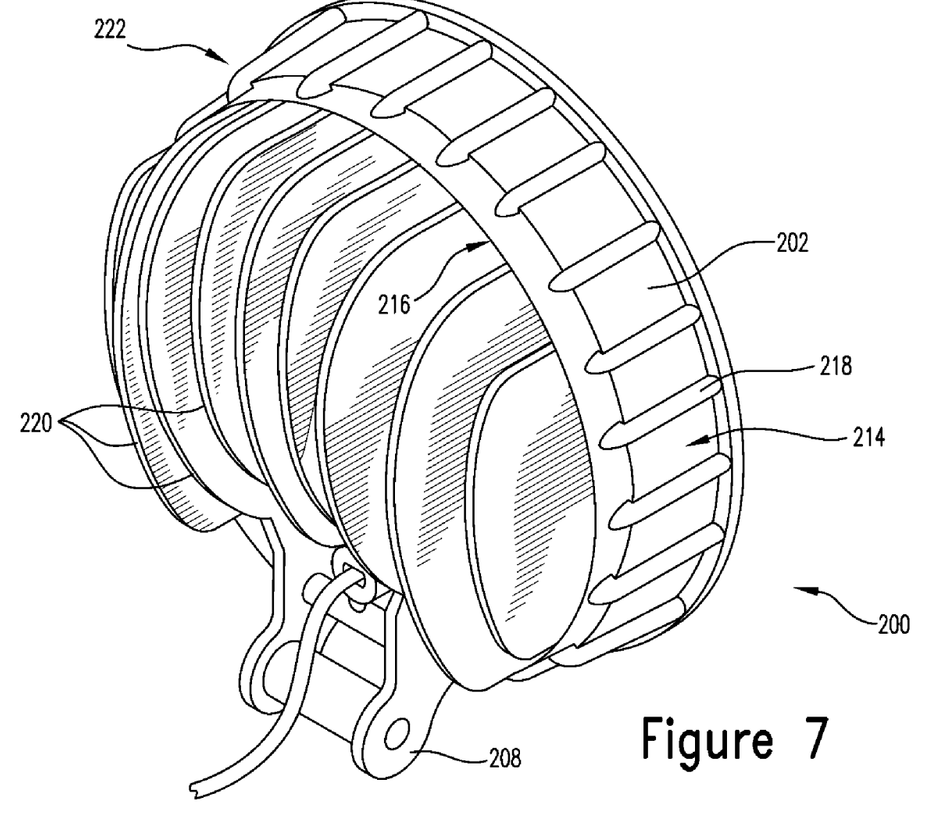
FIG. 7 is a perspective view of the back of the lamp assembly illustrated in FIG. 2.

The lamp assembly 200 has an exterior surface 222 that includes one or more fins 218 and/or 220. The fins 218, 220 function to provide an increased surface area of the exterior surface 222 in order to more easily dissipate heat from the lamp assembly 200 into the surrounding environment. With reference now to FIGS. 2 and 7, The fins 218 and 220 are located about substantially the entirety of the exterior surface 222. Other arrangements are possible in which less than substantially the entire exterior surface 222 have the fins 218, 220. The exterior surface 222 includes an exterior side surface 214 a portion of which is curved in shape. As shown, the entirety of the exterior side surface 214 is curved in shape except for the portion proximate to the hinge 208. Fins 218 are located on the exterior side surface 214 and extend in such a manner that they are parallel to one another. However, it is to be understood that in accordance with other embodiments the fins 218 need not be in parallel relationship to one another. Additionally, the fins 218 are spaced from one another an equal distance about the curved portion of the exterior surface 214. Again, in accordance with other embodiments the fins 218 need not be identically spaced from one another about the radial direction.

The exterior surface 222 includes an exterior end surface 216 that is more clearly shown with reference to FIG. 7. The exterior end surface 216 is generally flat and has fins 220 thereon. However, it is to be understood that the exterior end surface 216 can have one or more portions that are curved in shape in accordance with other embodiments. The fins 220 extend generally over the entirety of the exterior end surface 216, although other arrangements are possible in which the fins 220 do not extend over the entirety of the exterior end surface 216. The fins 220 are arranged so as to be generally parallel to one another. However, it can be seen that the center fin 220 and the fins 220 engaging the hinge 208 include portions that are not parallel to the rest of the fins 220. In this regard, the fins 220 are parallel to one another along at least half of the length of the exterior end surface 216, but are not parallel to one another along the entire length of the exterior end surface 216. The fins 220 are shown as being arranged in a vertical fashion such that they extend from the top of the housing 202 to the bottom of the housing 202. However, other arrangements are possible in which the fins 220 are not parallel to one another and can extend in any direction of housing 202. From 0 to 50 fins 218 and 220 may be incorporated into the lamp assembly 200 in accordance with various embodiments. Fins 220 are spaced an even distance from one another such that an even amount of space is present between adjacent fins 220. However, the fins 220 need not be arranged in this fashion in accordance with various embodiments. Additionally, fins 220 can be constructed in a variety of manners. For example, they may be flat, planar elements that are solid. It is to be understood that fins 220 can be variously configured in accordance with different embodiments.

It is to be understood that the specific designation for lamp assembly 200 is for the convenience of the reader and is not to be construed as limiting lamp assembly 200 to specific numbers, sizes, shapes or types of housing 202, circuit board assembly 104, thermal interface 204, connection device 206 and hinge 208 included in lamp assembly 200.

In addition, it is intended that lamp assembly 100 or lamp assembly 200 could also be used on commercial vehicles, trucks, buses, trailer bodies, of-highway vehicles, and agricultural vehicles. In various embodiments, lamp assembly 100 or lamp assembly 200 may be removably secured to the vehicle.

Figure 3:
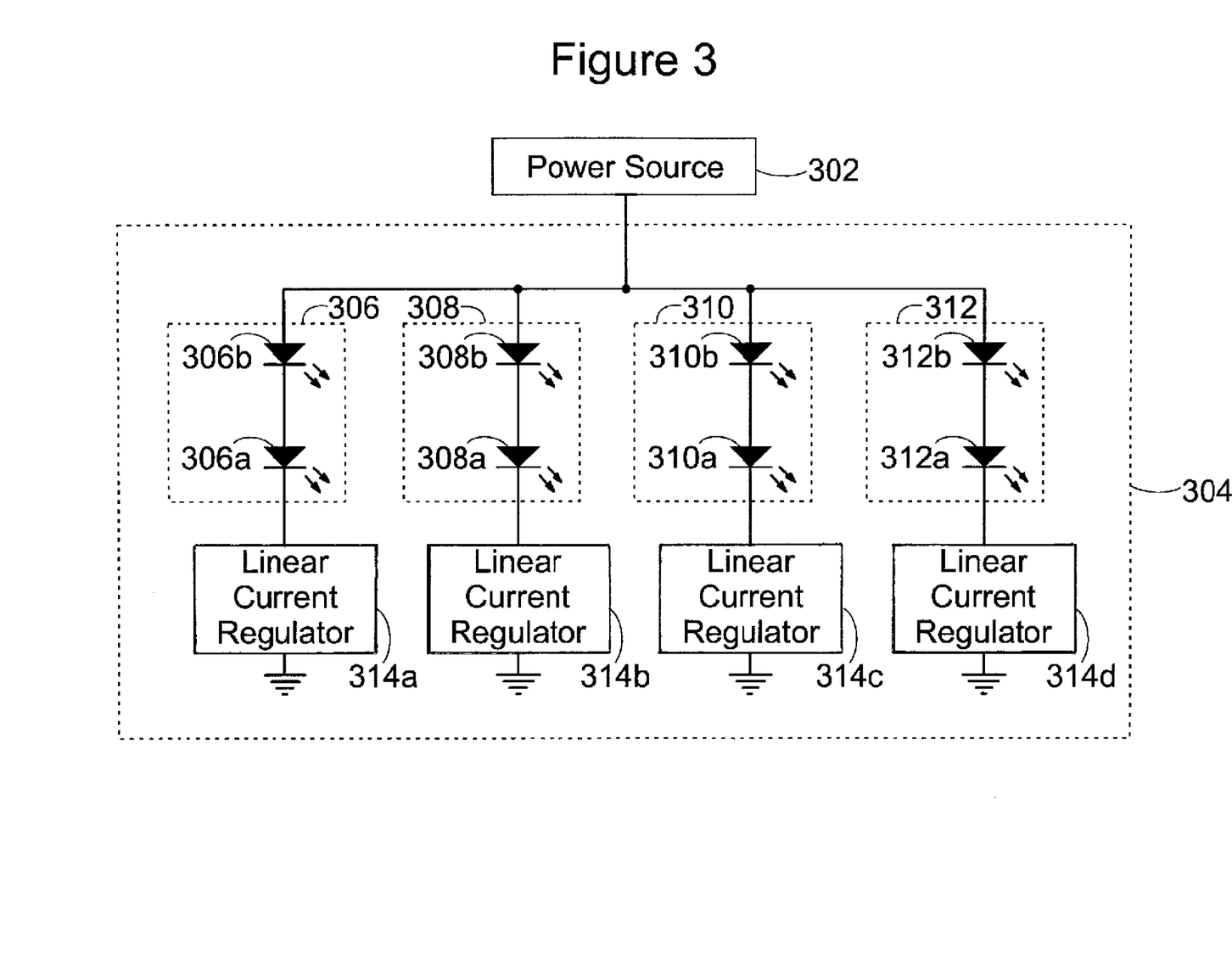
FIG. 3 is a schematic view of a first embodiment of a circuit assembly capable of driving the lamp assembly.

FIG. 3 illustrates a circuit board assembly 104 of a lamp assembly, which, in the embodiment shown, includes a power source 302 and a drive circuit 304. Drive circuit 304 includes a plurality of LED banks, such as LED bank 306, LED bank 308, LED bank 310, and LED bank 312 and a plurality of linear current regulators 314, such as linear current regulators 314a, 314b, 314c, and 314d. LED banks 306, 308, 310 and 312 include a plurality of LEDs, such as LEDs 306a and 306b, LEDs 308a and 308b, LEDs 310a and 310b, LEDs 312a and 312b, respectively.

Power source 302 is connected to LED banks 306, 308, 310 and 312. Power source 302 supplies operating voltage to drive circuit 304. Drive circuit 304 may operate over a wide range of operating voltages. In an embodiment as shown in FIG. 3, the operating voltage of drive circuit 304 is approximately in the range of 7 to 16 Volts. Examples of power source 302 may include, but are not limited to, an electrolytic battery, a solar battery and a fuel cell. LED banks 306, 308, 310 and 312 are connected to each other in parallel arrangement. In various embodiments, LED banks 306, 308, 310 and 312 are connected to each other in series, parallel or other combination thereof. LEDs 306a and 306b are connected in series with each other. Similarly, LEDs 308a and 308b, LEDs 310a and 310b, and LEDs 312a and 312b are connected in series.

Linear current regulators 314a, 314b, 314c, and 314d are connected in series with LED banks 306, 308, 310 and 312, respectively. Linear current regulators 314a, 314b, 314c, and 314d are configured to regulate the amount of electric current through LEDs 306a and 306b, LEDs 308a and 308b, LEDs 310a and 310b, LEDs 312a and 312b, respectively. The amount of electric current is regulated by varying the internal resistance of linear current regulators 314. However, one of ordinary skill in the art will readily appreciate that linear current regulators 314 may regulate the electric current at a variety of currents by varying the internal resistance.

In the embodiment shown in FIG. 3, LEDs 306a, 306b, 308a, 308b, 310a, 310b, 312a and 312b are present. It should be understood that any number of LEDs may be used, depending on the standards or specifications one attempts to meet. Further, the specific arrangement of LED banks 306, 308, 310, and 312 and LEDs 306a, 306b, 308a, 308b, 310a 310b, 312a and 312b is merely illustrative and is not to be construed as limiting drive circuit 304 to a specific arrangement. In an embodiment, drive circuit 304 is used in the lamp assembly configured to be mounted on a vehicle. However, in addition, other lamps or electrical devices that operate more efficiently with a constant current may utilize drive circuit 304 as described hereinabove.

Figure 4:
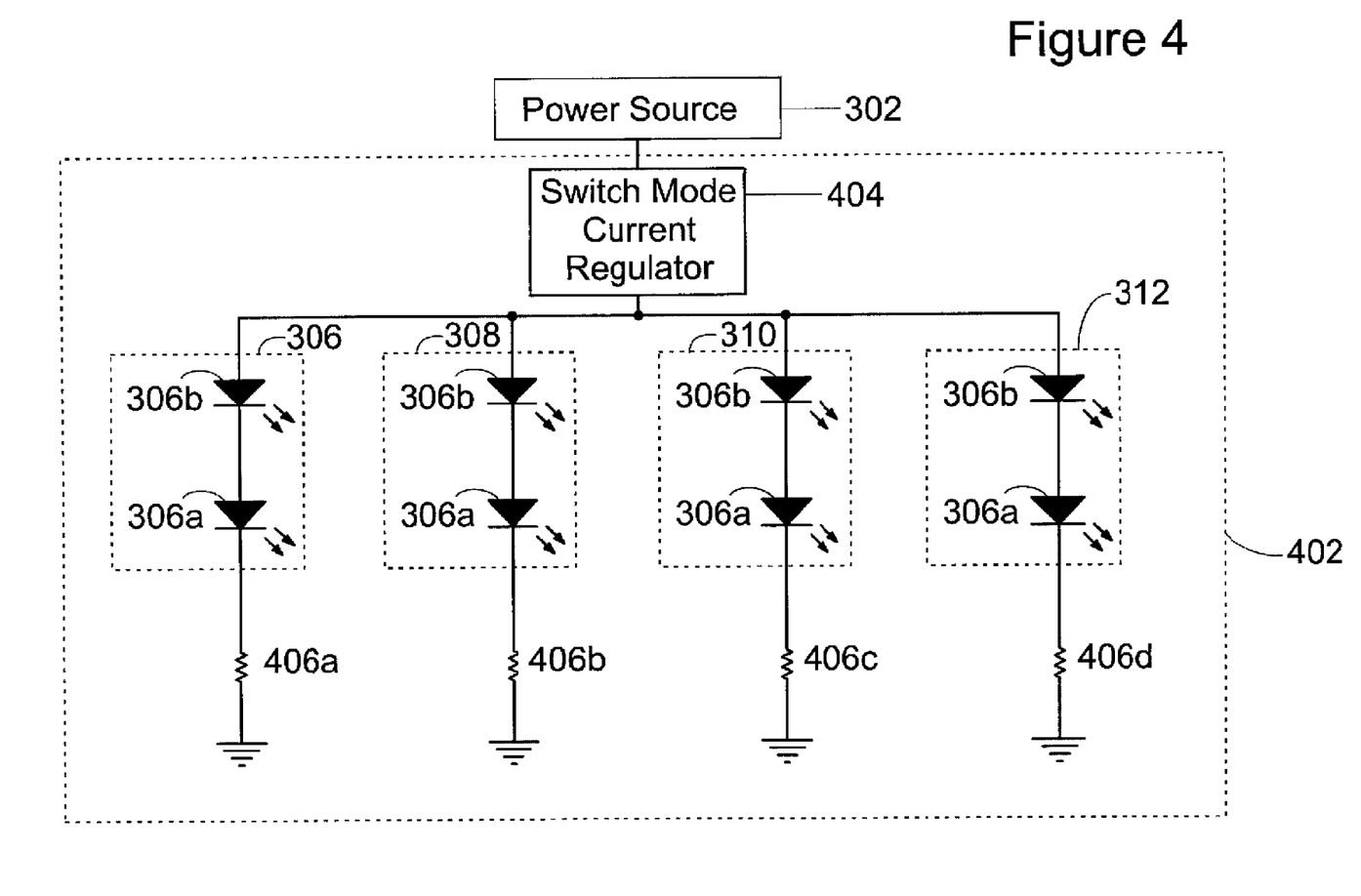
FIG. 4 is a schematic view of a second embodiment of a circuit assembly capable of driving the lamp assembly.

FIG. 4 shows circuit board assembly 104 of a lamp assembly, which, in the embodiment shown, includes power source 302 and a drive circuit 402. Drive circuit 402 includes LED banks 306, 308, 310 and 312, a switch mode current regulator 404 and one or more ballasting resistors 406, such as a ballasting resistor 406a, a ballasting resistor 406b, a ballasting resistor 406c and a ballasting resistor 406d.

Power source 302, LED banks 306, 308, 310, and 312 and LEDs 306a, 306b, 308a, 308b, 310a, 310b, 312a and 312b have been explained in reference to FIG. 3. Ballasting resistors 406a, 406b, 406c and 406d are connected in series with LED banks 306, 308, 310 and 312, respectively to form one or more series arrangements. Ballasting resistors 406a, 406b, 406c and 406d are configured to balance the amount of electric current flowing through LED banks 306, 308, 310 and 312. The one or more series arrangements are connected in parallel to form a parallel circuit.

Switch mode current regulator 404 is connected in series with the parallel circuit to regulate the amount of electric current flowing through LED banks 306, 308, 310 and 312. In an embodiment, switch mode current regulator 404 includes an inductor and regulates the amount of electric current by varying the duty cycle of the power supplied to the inductor.

It is to be understood that the specific arrangement of LED banks 306, 308, 310, and 312, LEDs 306a, 306b, 308a, 308b, 310a, 310b, 312a, and 312b, and ballasting resistors 406a, 406b, 406c, and 406d is for the convenience of the reader and is not to be construed as limiting drive circuit 402 to a specific arrangement. In an embodiment, drive circuit 402 is used in the lamp assembly configured to be mounted on a vehicle. However, in addition, other lamps or electrical devices that operate more efficiently with a constant current may utilize drive circuit 402 as described hereinabove.

Figure 5:
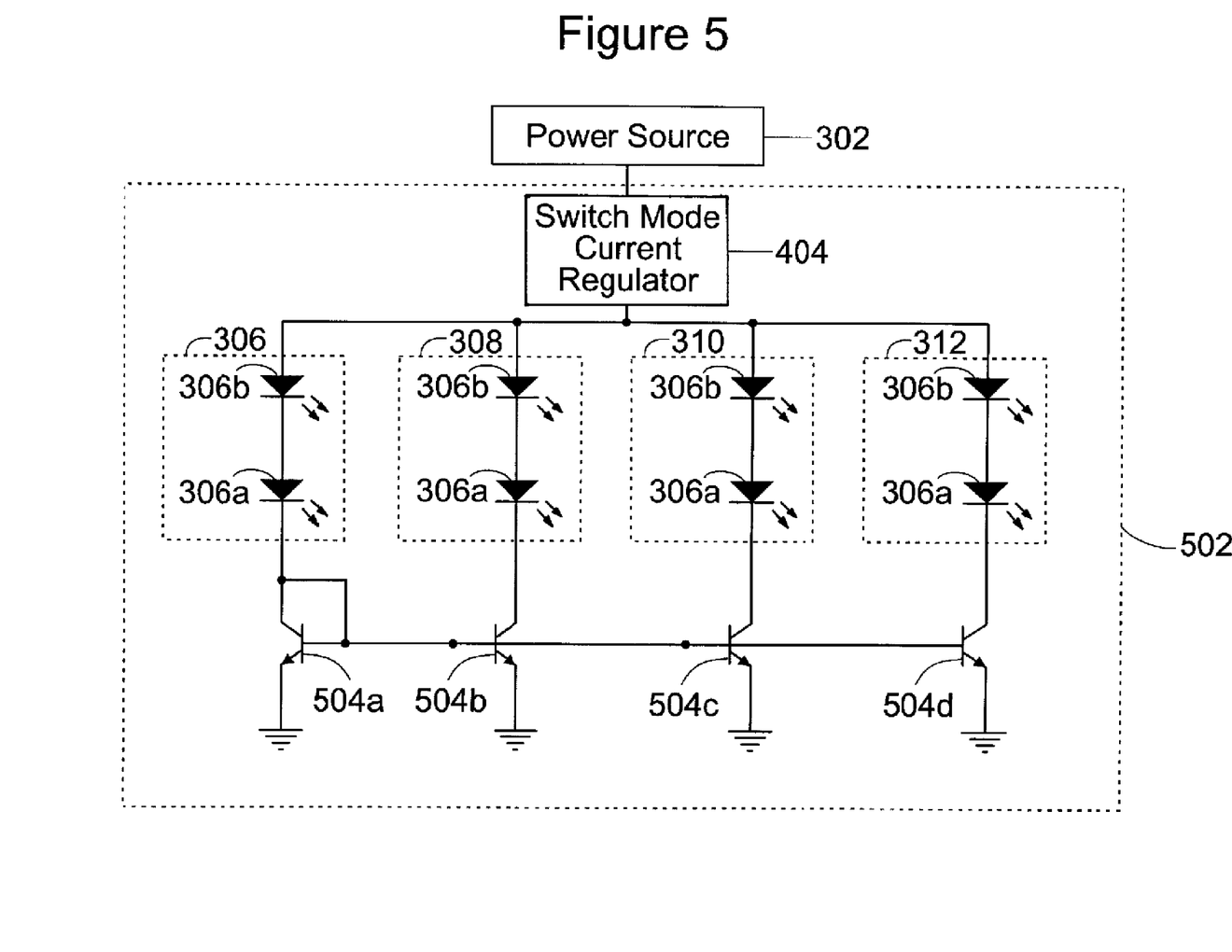
FIG. 5 is a schematic view of a third embodiment of a circuit assembly capable of driving the lamp assembly.

FIG. 5 shows circuit board assembly 104 of a lamp assembly, which, in the embodiment shown includes power source 302 and a drive circuit 502. Drive circuit 502 includes LED banks 306, 308, 310 and 312, a switch mode current regulator 404 and a current mirror 504. LED banks 306, 308, 310 and 312 include LEDs 306a and 306b, LEDs 308a and 308b, LEDs 310a and 310b, LEDs 312a and 312b, respectively. Power source 302 is connected with switch mode current regulator 404 and supplies power to drive circuit 502. Details pertaining to power source 302, LED banks 306, 308, 310, and 312 and LEDs 306a, 306b, 308a, 308b, 310a, 310b, 312a, and 312b have been explained in reference to FIG. 3.

Current mirror 504 includes a plurality of active devices, such as an active device 504a, an active device 504b, an active device 504c and an active device 504d. Examples of one or more active devices may include, but are not limited to, transistors and MOSFETs. In an embodiment, as shown in FIG. 5, the bases of each of active devices 504a, 504b, 504c and 504d are coupled together. Coupling of the bases lead to flow of an equal amount of current in LED banks 306, 308, 310, and 312. Active devices 504a, 504b, 504c and 504d are connected in series with LED banks 306, 308, 310 and 312, respectively, to form one or more series arrangements. The one or more series arrangements are connected in parallel to form a parallel circuit. In an embodiment, circuit board assembly 104 may be expanded by coupling additional similar series arrangement of LED banks and active devices in parallel with the parallel circuit. Further, switch mode current regulator 404 is connected in series with the parallel circuit to regulate the amount of electric current flowing through LED banks 306, 308, 310 and 312. Current mirror 504 is configured to equally distribute the electric current between LED banks 306, 308, 310 and 312.

It is to be understood that the specific arrangement of LED banks 306, 308, 310, and 312, LEDs 306a, 306b, 308a, 308b, 310a, 310b, 312a, and 312b, and active devices 504a, 504b, 504c and 504d is but a single embodiment and that the drive circuit 502 is not limited to this specific arrangement. In an embodiment, drive circuit 502 is used in the lamp assembly configured to be mounted on a vehicle. However, in addition, other lamps or electrical devices that operate more efficiently with a constant current may utilize drive circuit 502 as described hereinabove.

Figure 6:
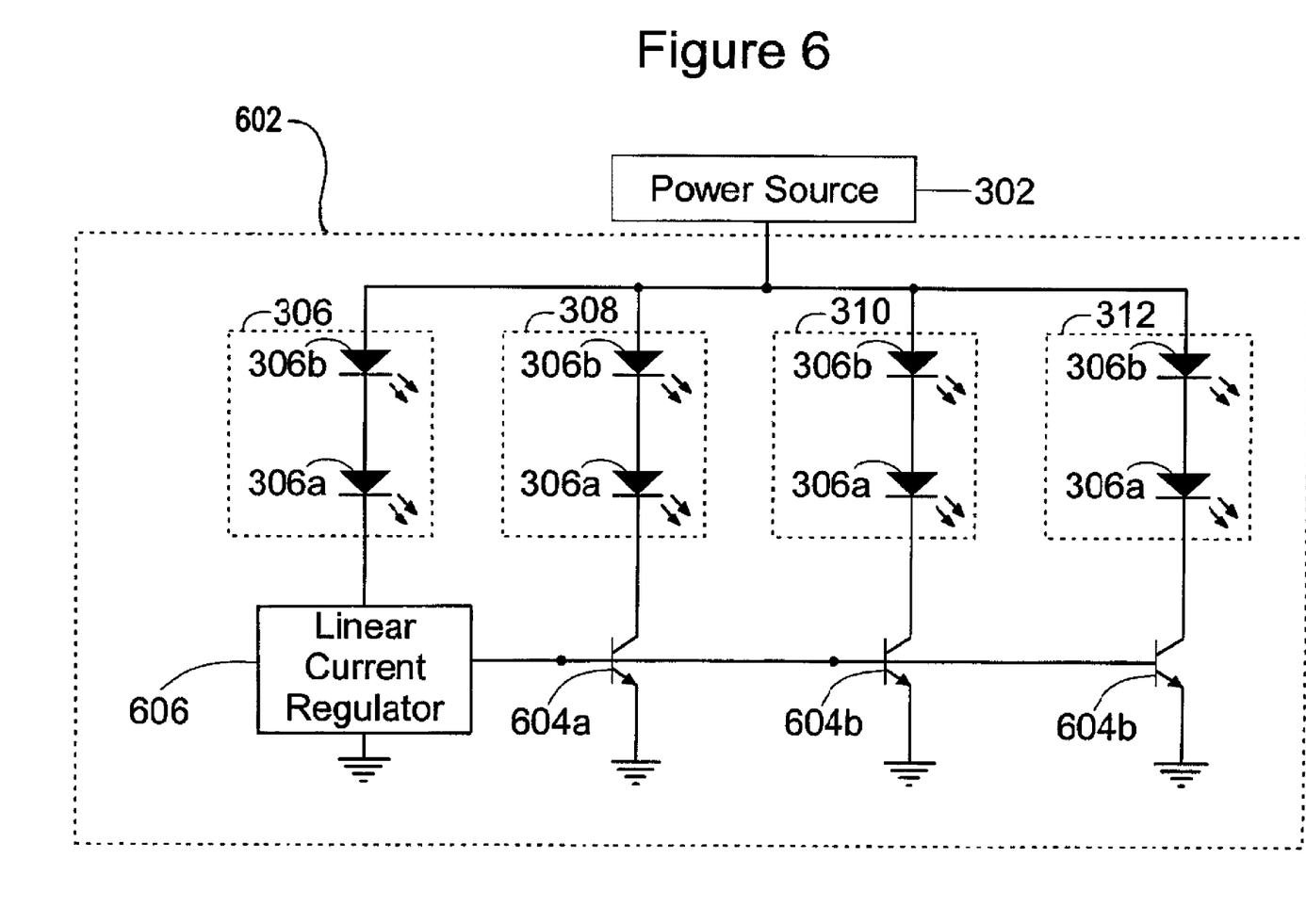
FIG. 6 is a schematic view of a fourth embodiment of a circuit assembly capable of driving the lamp assembly.

FIG. 6 shows circuit board assembly 104 of a lamp assembly, which, in the embodiment shown, includes power source 302 and a drive circuit 602. Drive circuit 602 includes LED banks 306, 308, 310 and 312, a current mirror 604 and a linear current regulator 606. Current mirror 604 includes one or more active devices, such as an active device 604a, 604b and 604c. Examples of one or more active devices may include, but are not limited to, transistors, integrated circuits and vacuum tubes.

Power source 302 is connected with LED banks 306, 308, 310 and 312 and supplies power to drive circuit 602. Linear current regulator 606 is associated with LED bank 306, hereinafter referred to as a first LED bank 306. In an embodiment, linear current regulator 606 is connected in series with first LED bank 306 and is configured to regulate the amount of electric current flowing through LEDs 306a and 306b in first LED bank 306.

As shown in FIG. 6, the bases of active devices 604a, 604b and 604c are coupled together. Active devices 604a, 604b and 604c affect the current flowing in each LED bank 308, 310, and 312, hereinafter referred to as additional LED banks. Active devices 604a, 604b and 604c affect the current such that the amount of current flowing through each of the additional LED banks is the same as the amount of current flowing through the first LED bank 306.

Details pertaining to power source 302, LED banks 306, 308, 310 and 312 and LEDs 306, 306b, 308a, 308b, 310a, 310b, 312a and 312b have been explained in reference to FIG. 3.

It is to be understood that the specific arrangement of LED banks 306, 308, 310, and 312, LEDs 306a, 306b, 308a, 308b, 310a, 310b, 312a, and 312b, linear current regulator 606 and active devices 604a, 604b and 604c is but a single embodiment and that the drive circuit 602 is not limited to this specific arrangement. In an embodiment, drive circuit 602 is used in the lamp assembly configured to be mounted on a vehicle. However, in addition, other lamps or electrical devices that operate more efficiently with a constant current may utilize drive circuit 602 as described hereinabove.

The lamp assembly may be thus configured so that a resistor drive is not present. Application of a current source in driving the LEDs 306 can result in decreased power dissipation at higher applied voltages. As such, the housing 102, 202 can be sufficient for use as a heat sink in removing heat generated through driving of the LEDs 306. The thermal interface 204 need not be present in certain embodiments as the mechanism of driving the LEDs 306 along with the provision of housing 102, 202 as a heat sink is sufficient to dissipate heat from the lamp assembly. As such, driving of the LEDs 306 though the use of current functions to improve the effectiveness of the housing 102, 202 as a heat sink to thus allow the housing 102, 202 to be optimally designed with respect to size, shape and material. In this regard, the housing 102, 202 can be made smaller or without fins 218, 220 in accordance with other embodiments due to the driving configuration of the LEDs 306. Driving of the LEDs 306 with current may allow for the circuit board assembly 104 to be made of a flame resistant 4 (FR4) material instead of another more costly material, such as a metal core board. Application of a current source may reduce the amount of heat needed to be dispersed in the lamp assembly thus increasing the efficiency of the housing 102, 202 when used as a heat sink.

While embodiments of the present invention have been described hereinabove, it is to be understood that the subject matter encompassed by way of the claimed invention is not to be limited to such embodiments. On the contrary, it is intended for the scope of the claimed invention to include all alternatives, modifications and equivalents as can be included within the spirit and scope of the following claims.

I claim:

1. A lamp assembly, comprising:
   a housing having an exterior side surface with a lens abutting edge at one end and a back wall abutting edge at a second end, a back wall with an interior surface and an exterior surface, at least one fin for use in dissipating heat from said housing, wherein the at least one fin extends from the exterior surface of the back wall by a length approximately equal to or less than the length of the exterior side surface from the lens abutting edge to the back wall abutting edge, wherein said housing functions as a heat sink;
   circuit board assembly positioned adjacent to the interior surface of the back wall of the housing, wherein said circuit board assembly has a drive circuit including at least one current regulator for use in driving a plurality of light emitting diodes;
   said plurality of light emitting diodes coupled to the circuit board assembly, wherein said light emitting diodes are configured to be driven by a current source regulated the at least one current regulator so as to reduce the amount of heat needed to be dissipated from said housing such that the at least one fin of a length approximately equal to or less than the length of the exterior side surface is sufficient for dissipating heat from the lamp assembly.

2. The lamp assembly as set forth in claim 1, wherein said plurality of light emitting diodes are arranged into a plurality of light emitting diode banks that each have a plurality of said of light emitting diodes connected in series; and
   wherein said circuit board assembly has a plurality of linear current regulators, wherein each one of said linear current regulators is associated with a different one of said plurality of light emitting diode banks, wherein each one of said linear current regulators is configured for regulating the current flowing through said plurality of light emitting diodes in said light emitting diode bank to which said linear current regulator is associated.

3. The lamp assembly as set forth in claim 1, wherein said plurality of light emitting diodes are arranged into a plurality of light emitting diode banks that each have a plurality of said light emitting diodes connected in series, wherein each said light emitting diode bank has a ballasting resistor configured for limiting the flow of current through said light emitting diode bank; and
   wherein said circuit board assembly has a switch mode current regulator for regulating the flow of current through said plurality of light emitting diode banks, wherein said switch mode current regulator has an inductor, and wherein said switch mode current regulator is configured for regulating current by varying the duty cycle of power applied to said inductor.

4. The lamp assembly as set forth in claim 1, wherein said plurality of light emitting diodes are arranged into a plurality of light emitting diode banks that each have a plurality of said light emitting diodes connected in series, wherein said plurality of light emitting diode banks are connected in parallel to one another;
   wherein said circuit board assembly has a switch mode current regulator for regulating the flow of current through said plurality of light emitting diode banks, wherein said switch mode current regulator has an inductor, and wherein said switch mode current regulator is configured for regulating current by varying the duty cycle of power applied to said inductor; and
   wherein said circuit board assembly has a current mirror configured to effect the regulated current in said plurality of light emitting diode banks such that the same amount of current flows through each one of said plurality of light emitting diode banks.

5. The lamp assembly as set forth in claim 1, wherein said plurality of light emitting diodes are arranged into a plurality of light emitting diode banks that each have a plurality of said light emitting diodes connected in series, wherein said plurality of light emitting diode banks are connected in parallel to one another;
   wherein said circuit board assembly has a linear current regulator associated with a first one of said plurality of light emitting diode banks, wherein said linear current regulator is configured for regulating the current flowing through said plurality of light emitting diodes in said first light emitting diode bank; and
   wherein said circuit board assembly has a current mirror configured to affect the current in additional light emitting diode banks of said plurality of fight emitting diode banks such that the same amount of current flows through each one of said additional light emitting diode banks of said plurality of light emitting diode banks as flows through said first fight emitting diode bank.

6. The lamp assembly as set forth in claim 1, wherein said circuit board assembly is made of a flame resistant material.

7. The lamp assembly as set forth in claim 1, wherein a thermal interface is not present between said circuit board assembly and said interior surface of said housing.

8. The lamp assembly as set forth in claim 1, wherein said exterior side surface is curved and includes a plurality of fins extending perpendicularly therefrom for use in dissipating heat from said housing.

9. The lamp assembly as set forth in claim 8, wherein said plurality of fins on said exterior side surface are parallel to one another.

10. The lamp assembly as set forth in claim 1, wherein a plurality of fins for use in dissipating heat from said housing are located on said exterior side surface.

11. The lamp assembly as set forth in claim 10, wherein said plurality of fins on said exterior side surface are parallel to one another along at least half of the length of said exterior side surface.

12. The lamp assembly as set forth in claim 1, wherein a thermal interface material is positioned between said circuit board assembly and said interior surface of the housing, wherein the thermal interface material is a phase change material.

13. A lamp assembly, comprising:
- a housing having an exterior side surface having a lens abutting edge at one end and a back wall abutting edge at a second end, a back wall with an interior surface and an exterior surface, wherein the exterior side surface includes a first plurality of fins extending perpendicularly therefrom, and wherein a second plurality of fins extending from said exterior surface of the back wall, wherein said first plurality and second plurality of fins are for use in dissipating heat from said housing thereby functioning as a heat sink;
- a circuit board assembly positioned adjacent to the interior surface of said housing, wherein said circuit board assembly has a drive circuit that has a current regulator; and
- a plurality of light emitting diodes, wherein said light emitting diodes are configured to be driven by a current source regulated by said current regulator so as to reduce the amount of heat needed to be dissipated from said housing, wherein said plurality of light emitting diodes are arranged into a plurality of light emitting diode banks that each have a plurality of said of light emitting diodes connected in series,
- wherein said circuit board assembly has a plurality of linear current regulators, wherein each one of said linear current regulators is associated with a different one of said plurality of light emitting diode banks, wherein said linear current regulators function as drive circuitry and are configured for regulating the current flowing through said plurality of light emitting diodes in said light emitting diode bank to which said linear current regulator is associated so as to reduce the amount of heat needed to be dissipated from said housing.

14. The lamp assembly of claim 13 wherein the second plurality of fins extends from the exterior surface of the back wall a length approximately equal to or less than the length of the exterior side surface.

* * * * *